March 24, 1970  V. F. ANDERSON ET AL  3,501,814
TWO PART FASTENING MEANS FOR ANIMAL COLLARS
Filed April 10, 1968  2 Sheets-Sheet 1
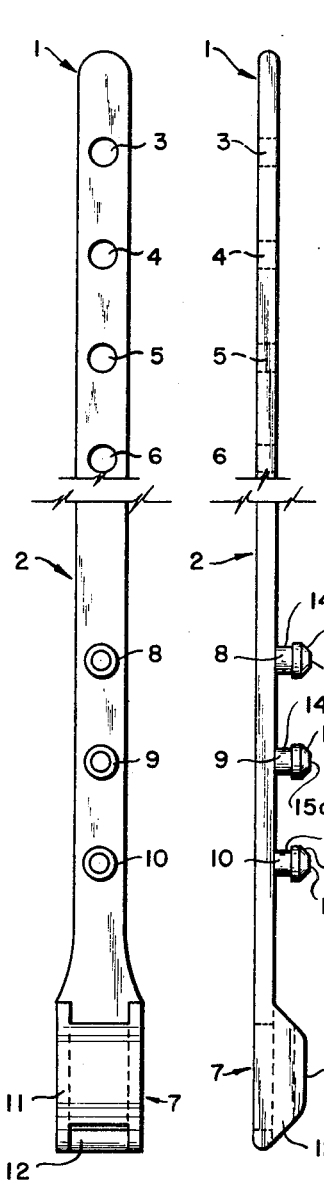
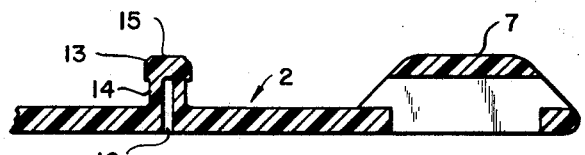
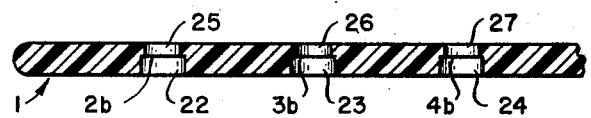
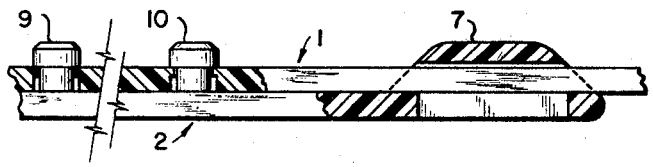
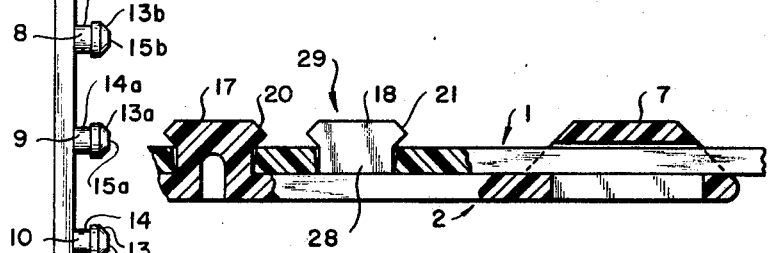
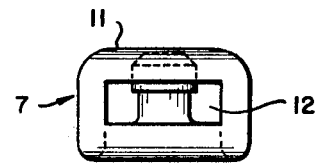
INVENTORS:
VICTOR P. ANDERSON
DAVID P. ATWOOD
BY: *Frank R. De Fontaine*
THEIR ATTORNEY INVENTORS:
VICTOR F. ANDERSON
DAVID P. ATWOOD
BY: *Frank R. LaFontaine*
THEIR ATTORNEY

United States Patent Office 3,501,814
Patented Mar. 24, 1970

3,501,814
TWO PART FASTENING MEANS FOR ANIMAL COLLARS
Victor F. Anderson, Wenonah, and David P. Atwood, Trenton, N.J., assignors to Shell Oil Company, New York, N.Y., a corporation of Delaware
Filed Apr. 10, 1968, Ser. No. 720,145
Int. Cl. B65d 63/00
U.S. Cl. 24—16                                   7 Claims

ABSTRACT OF THE DISCLOSURE

A two-part fastening assembly, one part including an elongated strap having a guide mounted substantially at the end thereof with one or more outwardly protruding studs positioned on the strap behind the guide; the other part including an elongated tongue passable through the guide with one or more openings disposed to fit over the studs. The fastening is achieved by passing the tongue through the strap guide and securing the openings on the studs.

BACKGROUND OF THE INVENTION

Field of the invention

The present invention entails a two-part fastening assembly made from any suitable flexible resilient material.

Preferred embodiments of the invention

The preferred use of the two-part fastening assembly is for a material such as a plastic resin, which has been formed into an animal collar, a belt, a cable binder, or any apparatus suitable for numerous other applications for plastic straps or belts. Since the most preferred embodiment of the invention is for animal collars, the invention will be discussed hereafter in terms of animal collars.

In the use of articles made from plastic resins the invention has the advantages of being an inexpensive and rapid method for providing articles with a two-part fastening assembly, as the two parts may be integrally molded with the plastic article as will be more fully described below.

SUMMARY OF THE INVENTION

The present invention entails a two-part fastening assembly made from a flexible resilient material such as the two ends of a plastic resin animal collar. One part comprises an elongated strap having a guide mounted substantially at the end thereof. Positioned behind the guide in an outwardly protruding manner on the strap are one or more studs.

The other part of the fastening assembly is an elongated tongue with one or more openings conforming in shape to the shape of the studs. The tongue is passable through the mouth of the guide whereupon the openings are then pushed down over the studs, thus completing the fastening function.

The critical feature of the above-described fastening means is the interaction of the guide positioning and holding the tongue against the guide strap, and the studs interlocking the tongue to the guide strap. This combination results in substantially all of any force exerted by the object secured by the fastened strap and tongue being translated in the longitudinal axis of the fastened guide strap and tongue; thus the guide prevents any substantial force exerted by the object secured from working in the latitudinal axis which would separate the tongue from strap studs and disengage the fastening means. The design, however, readily permits intentional disengagement of the fastening means, as discussed below.

In the most preferred embodiment of the invention as an animal collar, the collar will remain secured about the animal's neck regardless of any forces exerted upon the collar except for a direct upward pull on the end of the tongue from the guide strap which serves to disengage the tongue openings from the studs. This latter type of force is very unlikely to be caused by any natural movements or contacts by the animal, but provides a simple means for manually detaching the tongue from the studs for intentional removal of the collar from the animal's neck.

The guide may be attached to the elongated strap by any means known in the art. For example, the strap may be attached to the guide by a riveting means. Preferably, the strap and guide are molded from a plastic resin material as one integral part. The guide may be mounted in various ways on the strap. For instance, it may be mounted at the end of the strap or mounted such that the end of the strap extends past the guide.

The guide may be of any shape compatible with the tongue strap, with the guide being adapted for the tongue to pass through. The top of the guide mouth may be closed or open. In the latter case, the sides of the guide mouth should have some means such as inwardly directioned lips to secure the tongue from being lifted from the guide strap by an external force exerted on the fastened strap and tongue.

Preferably, the bottom of the guide is a flat plane which comprises essentially the top of the strap. The top and sides of the guide should be of sufficient thickness, dependent upon the material used, to provide the desired strength to hold the tongue against the guide strap in the presence of any external forces exerted on the apparatus fastened by the invention.

The number of the studs positioned on the strap may be one to any number of studs that can be conveniently placed on the collar. In the preferred embodiment of the invention, three studs are used. The studs may be attached to the guide strap by any known means, such as riveting. Preferably the studs are molded as an integral part of the strap. In the case of a plurality of studs, the studs are positioned at certain intervals behind the mouth of the guide in an outwardly protruding manner.

The studs may be positioned in a variety of ways. For instance, they can be positioned linearly at even or odd intervals on the strap, or positioned non-linearly at even or odd intervals on the strap. The studs may be any height which will allow substantial penetration of the studs into the openings. When more than one stud is used, the studs may vary in height, however, studs of uniform height are preferred. Most preferred are studs high enough to penetrate through the openings and protrude substantially above the top of the tongue.

The shape of the studs may be any known to the art. For example, the studs may be rectangular, round, triangular, or hexangular in shape. Preferred are the rectangular and round shapes. When a plurality of studs are used, the studs may be of different shape. However the use of matched studs is preferred.

The studs may remain the same, decrease or increase in size from the base to the head of the studs. Preferred are studs which have heads flanged outwardly such that the head is larger than the base of the studs, in order to retain the tongue when the tongue openings are passed over the studs such that the flanged heads protrude above the top of the tongue.

The openings of the tongue are of the same shape and spacing as the shape and spacing of the studs. The openings may be sized in various ways. In the preferred use of the invention incorporating flanged heads, the openings may be uniformly slightly smaller than the head of the studs, but the same size as the base of the studs. The flanged heads are forced up through and above the flexible tongue openings, leaving the openings fitting snugly about the base of the studs with the protruding flanged heads locking the tongue in place.

Alternatively, for example, the openings may be the same size as the flanged heads at the bottom of the tongue and then decrease in size towards the top of the tongue. This allows entry of the stud's flanged head into the opening at the bottom of the tongue and a snug fit about the base of the base of the stud once the flanged head has been pushed above the plane of the top of the tongue.

The number of the openings should be at least as numerous as the studs on the guide strap. In the preferred use of the invention for fastening animal collars, the tongue has a greater number of openings than the studs on the guide strap to permit adjusting the size of the collar around the animal's neck. Any portion of the tongue extending beyond the studs once the collar is fastened may be cut off and discarded.

BRIEF DESCRIPTION OF THE DRAWINGS

The accompanying drawings set forth, for the purpose of illustration, the most preferred embodiment of the invention for use in animal collars made from plastic resins wherein the guide and studs are an integral part of the guide strap.

In the drawing:

FIGURE 1 is a top view of the guide strap and tongue with the collar middle broken away.

FIGURE 2 is a side view of FIGURE 1.

FIGURE 3A is a cross section of a side view of the guide strap and one stud with the remainder of the collar broken away.

FIGURE 3B is a cross section of a side view of the tongue showing the openings which are of different sizes at the bottom and top of the tongue.

FIGURE 4 is a partial cross section showing a full side view of circular studs on the guide strap and a cross section of the tongue interlocked thereto with a part broken away between the studs, and a cross section view of the guide and strap positioning and holding a full side view of the tongue.

FIGURE 5 is a partial cross section showing a cross section of the guide strap and one rectangular stud, a side view of one rectangular stud, a cross section of the tongue secured to both studs, and a cross section of the guide and strap with a side view of the tongue positioned in the guide.

FIGURE 6 is a front view of the guide with a circular stud behind the mouth of the guide.

Referring to FIGURE 1 and FIGURE 7, there is shown a tongue 1 having spaced openings 3, 4, 5 and 6 of the same size. A guide strap 2 is integrally molded with the guide 7, and with the matched studs of circular shape 8, 9 and 10, or of rectangular shape 17 and 18 in FIGURE 5. The guide top 11 is closed, with the guide passage 12 shaped to be compatible with and allow passage of the tongue 1.

Referring to FIGURE 2 and FIGURE 3, the circular matched studs 8, 9 and 10 have matched flanged heads 13, 13a and 13b which are larger than the bases 14, 14a and 14b of the studs. The flanged heads 13, 13a and 13b are beveled to tops 15, 15a and 15b which are the same size as the bases 14, 14a and 14b to allow ease of entry into the openings 3, 4, 5 and 6. The flanged heads thus lock the tongue 1 to the guide strap 2. Referring to FIGURE 5, the rectangular studs 17 and 18 also have flanged heads 20 and 21 which interlock the tongue 1 to the guide strap 2. The flange of head 21 is also larger than the stud base 28, with the stud head 21 tapering to a top 29 the same size as the stud base 28.

Figure 7:
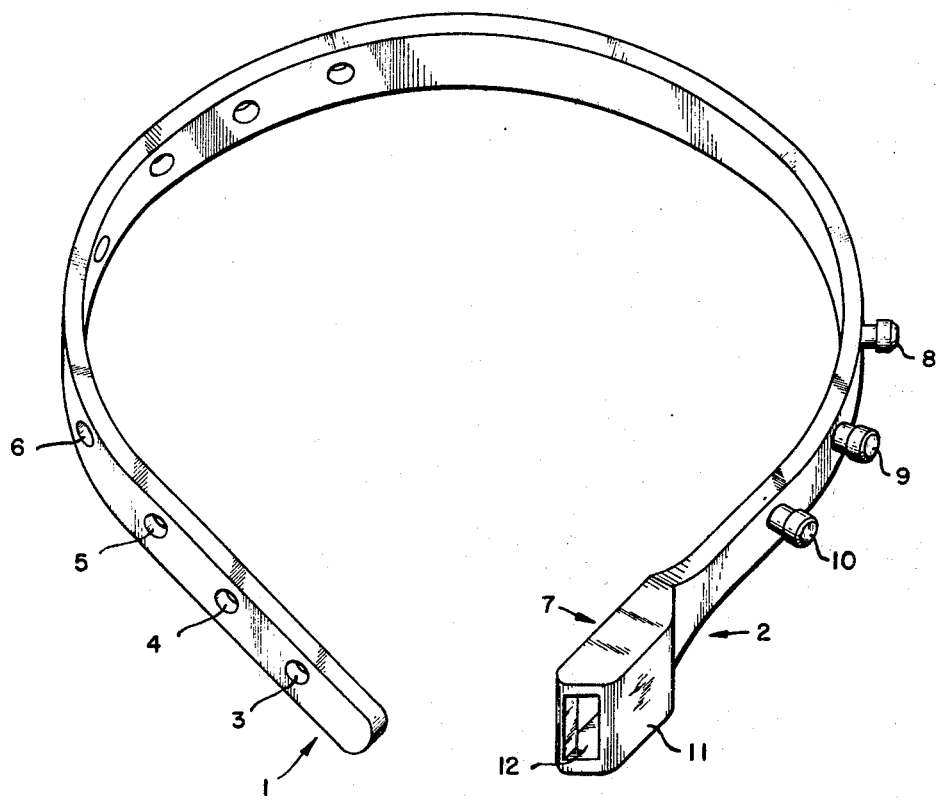
FIGURE 7 is a perspective view of an animal collar incorporating the detachable fastening means of the invention.

The openings 3, 4, 5 and 6 in the tongue may be the same size as the stud bases 14 and 28 uniformly through the tongue 1, or, referring to FIGURE 3, the openings 2b, 3b and 4b may be the same size as the flanged heads 13, 20 and 21 at the opening bottoms 22, 23 and 24 of tongue 1, and decrease to a size commensurate with the stud bases 14 and 28 at the opening tops 25, 26 and 27 of the tongue 1.

Referring to FIGURES 4 and 5, the tongue 1 and the guide strap 2 are fastened together by passing the tongue 1 through the mouth 12 of the guide 7 and pressing the openings 3, 4, 5 and 6, or 2b, 3b and 4b over the studs 8, 9 and 10 or 17 and 18 such that the stud heads 13 or 20 and 21 are above the plane of the tongue 1.

We claim as our invention:

1. A two-part fastening assembly, one part including an elongated strap having a guide substantially at the end thereof;
   the elongated strap having at least one outwardly protruding stud positioned behind the guide;
   the other part including an elongated tongue passable through the guide having at least one opening disposed to fit over the stud, the guide and stud cooperating with the tongue opening to fasten the strap and the tongue together, said stud comprising a base and an enlarged bevel head on the end thereof, said base having a slot therein to add resiliency thereto which extends from the head through the strap, said base having thickness substantially equal to that of the strap, the stud engaging opening in the strap having a portion of reduced dimension to prevent inadvertent withdrawal of the stud head therethrough and a portion of enlarged dimension to facilitate entry of the stud head into the opening, said portions forming with each other an integral shoulder in the opening.

2. The two-part fastening assembly of claim 1, the strap having at least three matched flanged studs, the guide having a closed top, and the tongue having at least three uniform openings disposed to fit over the studs.

3. The two-part fastening assembly of claim 2, wherein the strap is made from a plastic material and the guide and stud are an integral part thereof.

4. The two-part fastening assembly of claim 3, wherein the tongue and guide strap constitute the two ends of an animal collar.

5. The two part assembly of claim 3 wherein the studs and openings are rectangular in shape.

6. The two-part assembly of claim 3, wherein the studs and openings are circular in shape.

7. The two-part fastening assembly of claim 2, wherein the guide has an enclosed top for retaining the tongue against the guide strap.

References Cited

UNITED STATES PATENTS

| | | |
|---|---|---|
| 1,345,750 | 7/1920 | Beaumont. |
| 2,818,871 | 1/1958 | Beaudry. |
| 2,900,696 | 8/1959 | Bacon. |
| 2,970,359 | 2/1961 | Dryden. |
| 3,130,464 | 4/1964 | Barlow _____ 24—208.3 |

FOREIGN PATENTS

| | | |
|---|---|---|
| 695,251 | 9/1964 | Canada. |
| 1,058,862 | 10/1953 | France. |
| 1,118,606 | 3/1956 | France. |
| 1,212,605 | 10/1959 | France. |
| 861,929 | 3/1961 | Great Britain. |

DONALD A. GRIFFIN, Primary Examiner